US012604025B2

(12) United States Patent　　　　　(10) Patent No.:　US 12,604,025 B2
Auchmann　　　　　　　　　　　　　(45) **Date of Patent:　　*Apr. 14, 2026**

(54) METHOD FOR VERIFYING IMAGE DATA ENCODED IN AN ENCODER UNIT

(71) Applicant: Matthias Auchmann, Vienna (AT)

(72) Inventor: Matthias Auchmann, Vienna (AT)

(73) Assignee: Matthias Auchmann, Vienna (AT)

( * ) Notice: Subject to any disclaimer, the term of this patent is extended or adjusted under 35 U.S.C. 154(b) by 0 days.

This patent is subject to a terminal disclaimer.

(21) Appl. No.: 18/528,815

(22) Filed: Dec. 5, 2023

(65) Prior Publication Data

US 2024/0187632 A1　　Jun. 6, 2024

(30) Foreign Application Priority Data

Dec. 5, 2022　　(EP) ..................................... 22020595

(51) Int. Cl.
　　*H04N 19/48*　　　　　(2014.01)
　　*H04N 19/119*　　　　(2014.01)
　　　　　　　(Continued)

(52) U.S. Cl.
　　CPC ........... *H04N 19/48* (2014.11); *H04N 19/119* (2014.11); *H04N 19/17* (2014.11); *H04N 19/30* (2014.11); *H04N 19/42* (2014.11); *H04N 19/463* (2014.11)

(58) Field of Classification Search
　　CPC ...... H04N 19/48; H04N 19/119; H04N 19/17; H04N 19/30; H04N 19/42; H04N 19/463
　　See application file for complete search history.

(56) References Cited

U.S. PATENT DOCUMENTS 10,015,462 B1　　7/2018　Quach
2007/0157070 A1　　7/2007　Wenger et al.
(Continued)

FOREIGN PATENT DOCUMENTS

CA　　　2847028 A1　　9/2014

OTHER PUBLICATIONS

European Office Action issued Apr. 24, 2023 for corresponding European Application No. 22020595.9.
(Continued)

*Primary Examiner* — Jae N Noh
(74) *Attorney, Agent, or Firm* — POLSINELLI PC

(57)　　　　　ABSTRACT

The present invention relates to a method for verifying image data encoded in an encoder unit, wherein the encoder unit comprises a safe part and a non-safe part, and wherein the method (1) comprises the steps of:
　Acquiring image data in the safe part of the encoder unit (2);
　Encoding the acquired image data by a non-safe encoder in the non-safe part of the encoder unit (3);
　Decoding the encoded image data by a non-safe decoder in the non-safe part of the encoder unit (4); and
　Comparing the decoded image data with the acquired image data in the safe part of the encoder unit (5), wherein if the decoded image data does not match the acquired image data exactly nor within an acceptable threshold for the comparison a safety focused reaction is initiated, and wherein if the decoded image data matches the acquired image data exactly or within the acceptable threshold for the comparison a first safety sequence is generated based on the decoded image data in the safe part of the encoder unit and the encoded image data and the first safety sequence are transmitted to a decoder unit for decoding the encoded image data.

13 Claims, 3 Drawing Sheets

(51) Int. Cl.

| | | |
|---|---|---|
| *H04N 19/17* | (2014.01) | |
| *H04N 19/30* | (2014.01) | |
| *H04N 19/42* | (2014.01) | |
| *H04N 19/463* | (2014.01) | |

(56) References Cited

U.S. PATENT DOCUMENTS

| 2024/0187632 A1* | 6/2024 | Auchmann | .......... H04N 19/172 |
|---|---|---|---|
| 2025/0086425 A1* | 3/2025 | Liu | ........................ G06N 3/045 |

OTHER PUBLICATIONS

"MAF Overview Document" , 82. MPEG Meeting; Oct. 22, 2007-Oct. 26, 2007; Shenzhen; (Motion Picture Expert Group or ISO/IEC JTC1/SC29/WG11), No. n9421, 2007 XP030278075.

* cited by examiner

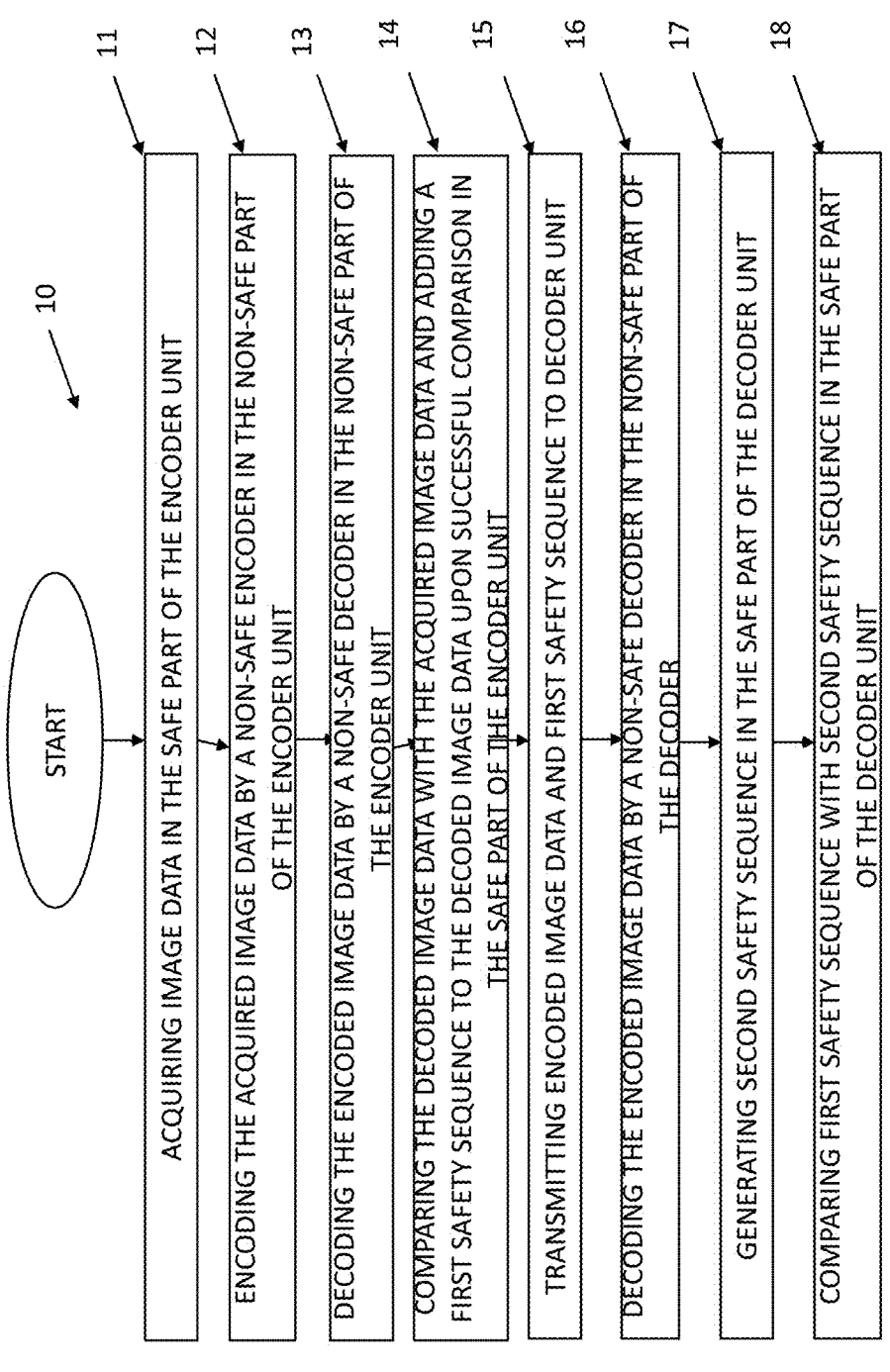

START

11 — ACQUIRING IMAGE DATA IN THE SAFE PART OF THE ENCODER UNIT

12 — ENCODING THE ACQUIRED IMAGE DATA BY A NON-SAFE ENCODER IN THE NON-SAFE PART OF THE ENCODER UNIT

13 — DECODING THE ENCODED IMAGE DATA BY A NON-SAFE DECODER IN THE NON-SAFE PART OF THE ENCODER UNIT

14 — COMPARING THE DECODED IMAGE DATA WITH THE ACQUIRED IMAGE DATA AND ADDING A FIRST SAFETY SEQUENCE TO THE DECODED IMAGE DATA UPON SUCCESSFUL COMPARISON IN THE SAFE PART OF THE ENCODER UNIT

15 — TRANSMITTING ENCODED IMAGE DATA AND FIRST SAFETY SEQUENCE TO DECODER UNIT

16 — DECODING THE ENCODED IMAGE DATA BY A NON-SAFE DECODER IN THE NON-SAFE PART OF THE DECODER

17 — GENERATING SECOND SAFETY SEQUENCE IN THE SAFE PART OF THE DECODER UNIT

18 — COMPARING FIRST SAFETY SEQUENCE WITH SECOND SAFETY SEQUENCE IN THE SAFE PART OF THE DECODER UNIT

METHOD FOR VERIFYING IMAGE DATA ENCODED IN AN ENCODER UNIT

The present invention relates to a method for verifying image data encoded in an encoder unit, wherein the method can easily be implemented, and wherein the method can be configured in such a way, that image data encoded in the encoder unit can be verified in a relatively simple manner.

Common video surveillance or in-vehicle video applications do not rely on analog Closed-Circuit Television (CCTV) anymore, but use modern streaming video cameras, streaming video over networks like for example Ethernet.

When an optical sensor, such as a camera, is sampled, for example multiple image frames, respectively video frames per second can be retrieved. Therein, in order to reduce the required network bandwidth, the data acquired from the optical sensor is usually compressed by a video codec, such as H.264/AVC or H.265/HEVC. The video data is then transmitted over a network, for example an Ethernet or a WLAN, to one or multiple receivers for example a computer, video recorder, some other displaying or processing unit or Human Machine Interface (HMI), for displaying the video data. Therein, the optical sensor usually uses an encoder to compress the video data, whilst the receiver uses a decoder to display, record or otherwise process the encoded video image frames.

Encoding is the process of translating information into a form that can be transmitted to another person or system. The sender must first encode their message in a way that can be understood by the recipient, and then the recipient must correspondingly decode the message in order to understand it. This process of encoding and decoding is essential for effective communication.

However, H.264/AVC and H.265/HEVC, like most modern video compression codecs, employ complicated techniques to reduce the bandwidth required to transmit a stream of video image frames. Further, many safety regulations have to be complied with in order to ensure the safety of products, activities or processes, such as IEC 61508, EN 50128 or EN 50657. IEC 61508 is intended to be a basic functional safety standard applicable to all kinds of industries, in particular to Electrical/Electronic/Programmable Electronic Safety-related Systems. EN 50128 and EN 50657 are European standards for safety relevant software in the railway domain which includes both the track and the train.

Therefore, both, an encoder and a decoder usually use complex algorithms, either implemented in software or offloaded to dedicated hardware to accelerate the video encoding/decoding process. Thus, it is usually a complicated task to verify that the used encoder and decoder fulfill the requirements of the safety regulations, such as IEC 61508, EN 50128 or EN 50657.

US 2007/0157070 A1 discloses a method for verifying a match between states of a first video processor and a second video processor, wherein one of said first and second video processors is a video encoder utilizing predictive video encoding and the other one of said first and second video processors is a video decoder capable of reproducing a decoded bit stream from an encoded bit stream generated by said video encoder.

It is an object of the present invention to provide an improved method for verifying image data encoded in an encoder unit.

This object is solved by a method for verifying image data encoded in an encoder unit according to claim 1.

This object is further solved by an encoder unit according to claim 8.

According to one embodiment of the invention, this object is solved by a method for verifying image data encoded in an encoder unit, wherein the encoder unit comprises a safe part and a non-safe part, and wherein image data, in particular image data from a source of image data is acquired in the safe part of the encoder unit, the acquired image data is encoded by a non-safe encoder in the non-safe part of the encoder unit, wherein the encoded image data is decoded by a non-safe decoder in the non-safe part of the encoder unit and the decoded image data is compared with the acquired image data in the safe part of the encoder unit, wherein if the decoded image data does not match the acquired image data exactly nor within an acceptable threshold for the comparison, a safety focused reaction is initiated, and wherein if the decoded image data matches the acquired image data exactly or within the acceptable threshold for the comparison a first safety sequence is generated based on the decoded image data in the safe part of the encoder unit and the encoded image data and the first safety sequence are transmitted to a decoder unit for decoding the encoded image data. Therein, safe means that the corresponding part is safety-qualified and/or has a high integrity level and non-safe means that the corresponding part is not safety critical and does not have to be safety-qualified, wherein the safety focused reaction comprises flagging decoded image data that does not correspond to the originally acquired image data, respectively regions in the decoded image data that do not correspond to the corresponding regions in the originally acquired image data, or turning the corresponding source of image data off and/or deleting the image data acquired from the corresponding source of image data, and wherein the first safety sequence is one of a cryptographic hash, a checksum or a signature.

Here, image data is data produced by scanning a surface with an optical or electronic device. Further, the image data can in particular include video data.

Further, a safe part is a part that is safety-qualified and/or has a comparable high Safety Integrity Level (SIL). Here, the encoder unit also includes at least one part that is not safety critical and does not have to be safety-qualified, in particular a non-safe encoder and a non-safe decoder.

Further, a safety focused reaction is an action that is initiated to avoid safety critical situations, wherein the safety focused reaction comprises flagging decoded image data that does not correspond to the originally acquired image data, respectively regions in the decoded image data that do not correspond to the corresponding regions in the originally acquired image data, or turning the corresponding source of image data off and/or deleting the image data acquired from the corresponding source of image data.

That the decoded image data matches the acquired image data exactly or within an acceptable threshold for the comparison, respectively corresponds to the acquired image data further means that a similarity between the decoded image data and the acquired image data exceeds a threshold for the similarity, wherein the threshold for the similarity can for example be set based on the safety criticality of an application that further processes the acquired data.

According to the invention, the first safety sequence is data added to ensure safety of end-to-end transmissions by combining some or all of the well-known techniques used for safety layers like for example using sequence counters and implicit data as well as the data itself, combined with checksums, cryptographic hashes and/or signatures.

Here, a checksum is a is a small-sized block of data derived from another block of digital data for the purpose of detecting errors that may for example have been introduced during its transmission or storage.

Further, a cryptographic hash is a security-based hash function which makes it almost impossible to reverse a code to the original data.

Further, a signature is a digital signature, respectively unique information that is added to encoded video data.

Such checksums, cryptographic hashes or signatures can usually be generated in a very simple way and enable checking data corruption in a very simple way.

Further, an acceptable threshold for the comparison is a threshold that is based on the fact that almost all encoding/decoding algorithms are not lossless and change the pixel data in an image in order to strike the right balance between quality degradation and bandwidth improvement.

According to the method, the parts of the encoder unit that are not safety critical are doing most of the work, respectively components that do not need to be safety-qualified and do not need to be developed according to stringent safety standards. In particular, the use of a safe encoder and/or a safe decoder would require immense efforts to develop according to safety standards due to their size and complexity. Further, only as much safe parts as necessary to enable these non-safe parts to operate safely are utilized, wherein each of the utilized safe parts, for example a safe comparing unit to compare the decoded image data with the acquired image data in the encoding unit, can be kept very simple, especially when compared to the immensely complex non-safe encoder and non-safe decoder. Therefore, the method can easily be implemented, and the method can be configured in such a way, that image data encoded in the encoder unit can be verified in a relatively simple manner.

Thus, an improved method for verifying image data encoded in an encoder unit might be provided.

The step of comparing the decoded image data to the acquired image data can further comprise dividing the decoded image data into a plurality of subregions, and, for each of the plurality of subregions, respectively comparing the corresponding subregion to a corresponding region of the acquired image data.

Here, a subregion is a group of connected pixels with similar properties.

By respectively comparing subregions, the comparison between the decoded image data and the acquired image data can be further simplified, whereby it can be ensured that a corresponding safe comparing unit can be kept very simple.

Further, the step of comparing the decoded image data to the acquired image data can further comprise using at least two different image comparison algorithms to respectively compare the decoded image data to the acquired image data, wherein it is determined that the decoded image data corresponds to the acquired image data only if more than a predetermined number of the at least two different image comparison algorithms have determined that the decoded image data corresponds to the acquired image data.

Here an image comparison algorithm is an algorithm that is configured to compare at least two sets of image data. That two different image comparison algorithms are used to respectively compare the decoded image data to the acquired image data means that the decoded image data and the acquired image data are at least compared by a first image comparison algorithm and by a second image comparison algorithm, wherein the first image comparison algorithm and the second image comparison algorithm are different algorithms.

Thereby, it can be ensured that safety requirements for higher safety integrity levels, for example SIL3 or SIL4, are met. Further, the influence of false positives can be reduced.

According to a further embodiment of the invention, a method for verifying image data transmitted from a source of image data to a processing unit for processing the image data by means of an encoder unit, wherein the encoder unit comprises a safe part and a non-safe part, and a decoder unit, wherein the decoder unit comprises a safe part and a non-safe part, is provided, wherein image data from the source of image data is acquired in the safe part of the encoder unit, the image data is encoded in the non-safe part of the encoder unit, and wherein the image data encoded in the non-safe part of the encoder unit is verified by a method for verifying image data encoded in an encoder unit as described above, the encoded image data and, in case of successful verification in the encoder unit, a corresponding first safety sequence are transmitted to the decoder unit, wherein the encoded image data is decoded by a non-safe decoder in the non-safe part of the decoder unit, a second safety sequence based on the decoded image data is generated in the safe part of the decoder unit, and the first safety sequence is compared with the second safety sequence in the safe part of the decoder unit, wherein the decoded image data is transmitted to the processing unit for further processing the image data if the first safety sequence corresponds to the second safety sequence, and wherein a safety focused reaction is initiated if the first safety sequence does not correspond to the second safety sequence, and wherein the second safety sequence is one of a cryptographic hash, a checksum or a signature.

Therein, a source of image data is a device that can acquire image data, for example an optical sensor. In particular, the source of image data can be a CMOS (complementary metal-oxide-semiconductor) camera sensor, or another system that can provide video frames to the encoder unit.

Further, a processing unit is a unit that is configured to process data transmitted to the processing unit, for example a display for displaying the transmitted data or a driver assistance system of a vehicle, respectively a function of an autonomous driving vehicle.

Thus, an improved method for verifying image data transmitted from a source of image data to a processing unit for processing the image data might be provided. According to the method, the parts of the encoder unit and the parts of the decoder unit that are not safety critical are doing most of the work, respectively components that do not need to be safety-qualified and do not need to be developed according to stringent safety standards. In particular, the use of a safe encoder and/or a safe decoder would require immense efforts to develop according to safety standards due to their size and complexity. Further, only as much safe parts as necessary to enable these non-safe parts to operate safely are utilized, wherein each of the utilized safe parts, for example a safe comparing unit to compare the decoded image data with the acquired image data in the encoder unit or a safe safety sequence generating unit for generating the second safety sequence in the decoder unit can be kept very simple, especially when compared to the immensely complex non-safe decoder. Therefore, the method can easily be implemented, and the method can be configured in such a way, that image data encoded in the encoder unit can be verified in a relatively simple manner. Further, a two-step safety mechanism, in particular comparing the decoded image data with the acquired image data on the one hand and comparing a first and second safety sequence on the other hand, is provided that provides end-to-end protection for image data, for example video frames.

Therein, the step of transmitting the first safety sequence to the decoder unit can comprise transmitting the first safety sequence to the decoder unit over a safety layer.

Here, safety layer is a technique respectively communication layer that ensures that the transmitted data can be checked by the receiver to verify that the data is not outdated respectively stale, and that the data has the integrity for the required safety level.

Thereby, it can be verified that the first safety sequence is safely transmitted to the decoder unit.

Further, the method can further comprise respectively encrypting the encoded image data and the corresponding first safety sequence, wherein the step of transmitting the encoded image data and the first safety sequence to the decoder unit comprises transmitting the encrypted encoded image data and the encrypted first safety sequence to the decoder unit.

Thereby, confidentiality can be ensured.

Further, the method can further comprise the step of adding a message authentication code to the communication between the encoder unit and the decoder unit, respectively to the encoded image data and the corresponding first safety sequence, wherein the step of transmitting the encoded image data and the first safety sequence to the decoder unit comprises transmitting the encoded image data and the first safety sequence together with the message authentication code to the decoder unit.

Here, a message authentication code is a cryptographic checksum on data that uses a key to detect both accidental and intentional modifications of the data. The message authentication code can also be signed with an asymmetric key algorithm, and the signature can be transmitted alongside with the message authentication code.

Thereby, integrity and authenticity can be provided.

According to still another embodiment of the invention, an encoder unit is provided, wherein the encoder unit comprises a safe acquiring unit, wherein the safe acquiring unit is configured to acquire image data, in particular image data from a source of image data, a non-safe encoder, wherein the non-safe encoder is configured to encode the acquired image data, a non-safe decoder, wherein the non-safe decoder is configured to decode the encoded image data, and a safe comparing unit, wherein the safe comparing unit is configured to compare the decoded image data with the acquired image data, wherein the safe comparing unit is configured to initiate a safety focused reaction if the decoded image data does not match the acquired image data exactly nor within an acceptable threshold for the comparison, and to generate a first safety sequence based on the decoded image data, wherein the encoded image data and the first safety sequence are transmitted to a decoder unit for decoding the encoded image data, if the decoded image data matches the acquired image data exactly or within an acceptable threshold for the comparison. Therein, safe means that the corresponding part is safety-qualified and/or has a high integrity level and non-safe means that the corresponding part is not safety critical and does not have to be safety-qualified, wherein the safety focused reaction comprises flagging decoded image data that does not correspond to the originally acquired image data, respectively regions in the decoded image data that do not correspond to the corresponding regions in the originally acquired image data, or turning the corresponding source of image data off and/or deleting the image data acquired from the corresponding source of image data, and wherein the first safety sequence is one of a cryptographic hash, a checksum or a signature.

Thus, an improved encoder unit might be provided. According to the encoder unit, parts of the encoder unit that are not safety critical are doing most of the work, respectively components that do not need to be safety-qualified and do not need to be developed according to stringent safety standards. In particular, the use of a safe encoder and/or a safe decoder would require immense efforts to develop according to safety standards due to their size and complexity. Further, only as much safe parts as necessary to enable these non-safe parts to operate safely are utilized, wherein each of the utilized safe parts, for example a safe comparing unit to compare the decoded image data with the acquired image data in the encoding unit, can be kept very simple. Therefore, the verification of the encoded image data can easily be implemented and be configured in such a way, that image data encoded in the encoder unit can be verified in a relatively simple manner.

Therein, the encoder unit can further comprise a safe dividing unit, wherein the safe dividing unit is configured to divide the decoded image data into a plurality of subregions, and wherein the safe comparing unit is configured to, for each of the plurality of subregions, respectively compare the corresponding subregion to a corresponding region of the acquired image data. By respectively comparing subregions, the comparison between the decoded image data and the acquired image data can be further simplified, whereby it can be ensured that a corresponding safe comparison unit can be kept very simple.

Further, the safe comparing unit can be configured to use at least two different image comparison algorithms to respectively compare the decoded image data with the acquired image data, wherein the safe comparing unit is configured to determine that the decoded image data corresponds to the acquired image data only if more than a predetermined number of the at least two different image comparison algorithms have determined that the decoded image data corresponds to the acquired image data. Thereby, it can be ensured that safety requirements are met. Further, the influence of false positives can be reduced.

In one embodiment, the safety sequence is a checksum or a cryptographic hash. Such checksums or cryptographic hashes can usually be generated in a very simple way and enable checking data corruption in a very simple way.

However, that the safety sequence is a checksum or a hash should merely be understood as possible embodiment, and the safety sequence can be any other suitable security signature, too.

According to still a further embodiment of the invention, a decoder unit is provided, wherein the decoder unit comprises a receiver to receive encoded image data, wherein the encoded image data has been verified by an encoder unit as described above, wherein a corresponding first safety sequence in case of successful verification in the encoder unit has been created and has been sent to the decoder unit, and wherein the decoder unit further comprises a non-safe decoder, wherein the non-safe decoder is configured to decode the encoded image data, a safe safety sequence generating unit, wherein the safe safety sequence generating unit is configured to generate a second safety sequence based on the decoded image data in the decoder unit, and a safe safety sequence matching unit, wherein the safe safety sequence matching unit is configured to compare the first safety sequence with second safety sequence, wherein the safe safety sequence matching unit is configured to allow transmission of the decoded image data to a processing unit for further processing the image data if the first safety sequence corresponds to the second safety sequence, and to initiate a safety focused reaction if the first safety sequence does not correspond to the second safety sequence, and wherein the second safety sequence is one of a cryptographic hash, a checksum or a signature.

Thus, an improved decoder unit might be provided. According to the decoder unit, parts of the decoder unit that are not safety critical are doing most of the work, respectively components that do not need to be safety-qualified and do not need to be developed according to stringent safety standards. In particular, the use of a safe encoder and/or a safe decoder would require immense efforts to develop according to safety standards due to their size and complexity. Further, only as much safe parts as necessary to enable these non-safe parts to operate safely are utilized, wherein each of the utilized safe parts, for example the safe safety sequence matching unit to compare the first safety sequence with the second safety sequence, can be kept very simple. Therefore, the verification of the encoded image data can easily be implemented and be configured in such a way, that image data encoded in the encoder unit can be verified in a relatively simple manner. Further, a two-step safety mechanism, in particular comparing the decoded image data with the acquired image data on the one hand and comparing a first and second safety sequence on the other hand, is provided that provides end-to-end protection for image data, for example video frames.

According to still a further embodiment of the invention, a system for verifying image data transmitted from a source of image data to a processing unit for processing the image data is provided, wherein the system comprises a source of image data for acquiring image data, an encoder unit as described above, a transmitting unit, a decoder unit as described above, and a processing unit for processing the acquired image data, wherein the encoder unit is configured to generate encoded image data based on the acquired image data, wherein the transmitting unit is configured to transmit the encoded image data from the encoder unit to the decoder unit, wherein the decoder unit is configured to decode the encoded image data, and wherein the processing unit is configured to process the decoded image data.

Thus, an improved system for verifying image data transmitted from a source of image data to a processing unit for processing the image data might be provided. According to the system, parts of the encoder unit and parts of the decoder unit that are not safety critical are doing most of the work, respectively components that do not need to be safety-qualified and do not need to be developed according to stringent safety standards. In particular, the use of a safe encoder and/or a safe decoder would require immense efforts to develop according to safety standards due to their size and complexity. Further, only as much safe parts as necessary to enable these non-safe parts to operate safely are utilized, wherein each of the utilized safe parts, for example a safe comparing unit to compare the decoded image data with the acquired image data in the encoding unit or a safe safety sequence generating unit for generating the second safety sequence in the decoder unit, can be kept very simple. Therefore, the system can easily be implemented, and the system can be configured in such a way, that image data encoded in the encoder unit can be verified in a relatively simple manner. Further, a two-step safety mechanism, in particular comparing the decoded image data with the acquired image data on the one hand and comparing a first and second safety sequence on the other hand, is provided that provides end-to-end protection for image data, for example video frames.

Therein, the transmitting unit can be configured to transmit the first safety sequence to the decoder unit over a safety layer. Thereby, it can be verified that the first safety sequence is safely transmitted to the decoder unit.

Further, the system can further comprise an encrypting unit, wherein the encrypting unit is configured to respectively encrypt the encoded image data and the corresponding first safety sequence, and wherein the transmitting unit is configured to transmit the encrypted encoded image data and the encrypted corresponding first safety sequence to the decoder unit. Thereby, confidentiality can be ensured.

Further, the system can further comprise an adding unit, wherein the adding unit is configured to add a message authentication code to the encoded image data and the corresponding first safety sequence, and wherein the transmitting unit is configured to transmit the encoded image data and the corresponding first safety sequence together with the message authentication code to the decoder unit.

Here, a message authentication code is a cryptographic checksum on data that uses a key to detect both accidental and intentional modifications of the data The message authentication code can also be signed with an asymmetric key algorithm, and the signature can be transmitted alongside with the message authentication code.

Thereby, integrity and authenticity can be provided.

The invention will now be described in further detail with reference to the attached drawings.

FIG. 2 illustrates a flowchart of a method for verifying image data transmitted from a source of image data to a processing unit for processing the image data according to embodiments of the invention;

FIG. 1 illustrates a flowchart of a method for verifying image data encoded in an encoder unit 1 according to embodiments of the invention.

Figure 1:
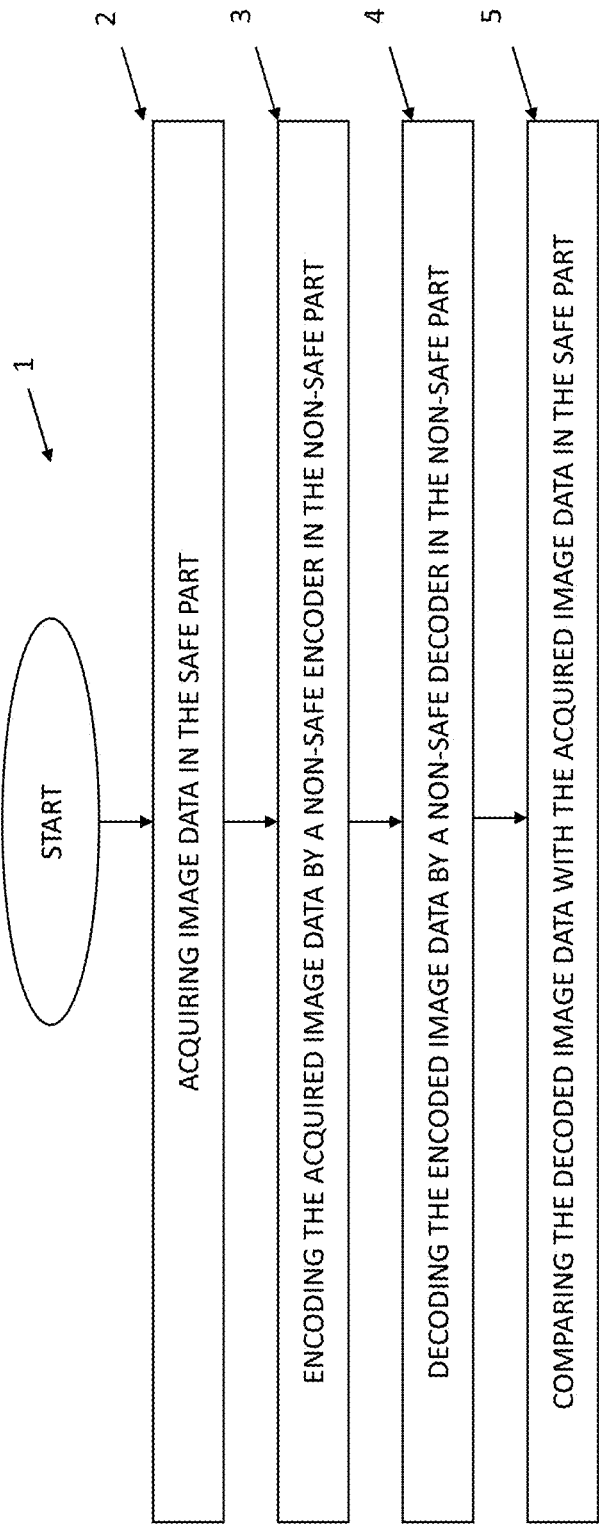
FIG. 1 illustrates a flowchart of a method for verifying image data encoded in an encoder unit according to embodiments of the invention.

FIG. 1 shows a method for verifying image data encoded in a encoder unit 1, wherein the encoder unit comprises a safe part and a non-safe part, and wherein the method 1 comprises a step 2 of acquiring image data from a source of image data in the safe part of the encoder unit, a step 3 of encoding the acquired image data by a non-safe encoder in the non-safe part of the encoder unit, wherein the encoded image data is decoded by a non-safe decoder in the non-safe part of the encoder unit in a step 4 and the decoded image data is compared with the acquired image data in the safe part of the encoder unit in a step 5, wherein if the decoded image data does not match the acquired image data exactly nor within an acceptable threshold for the comparison, a safety focused reaction is initiated, and wherein if the decoded image data does matches the acquired image data exactly or within the acceptable threshold for the comparison a first safety sequence is generated based on the decoded image data and the encoded image data and the first safety sequence are transmitted to a decoder unit for decoding the encoded image data. Therein, safe means that the corresponding part is safety-qualified and/or has a high integrity level and non-safe means that the corresponding part is not safety critical and does not have to be safety-qualified, wherein the safety focused reaction comprises flagging decoded image data that does not correspond to the originally acquired image data, respectively regions in the decoded image data that do not correspond to the corresponding regions in the originally acquired image data, or turning the corresponding source of image data off and/or deleting the image data acquired from the corresponding source of image data, and wherein the first safety sequence is one of a cryptographic hash, a checksum or a signature.

According to the shown method 1, parts of the encoder unit that are not safety critical are doing most of the work, respectively components that do not need to be safety-qualified and do not need to be developed according to stringent safety standards. In particular, the use of a safe encoder and/or a safe decoder would require immense efforts to develop according to safety standards due to their size and complexity. Further, only as much safe parts as necessary to enable these non-safe parts to operate safely are utilized, wherein each of the utilized safe parts, for example a safe comparing unit to compare the decoded image data with the acquired image data in the encoder unit, can be kept very simple, especially when compared to the immensely complex non-safe encoder and non-safe decoder. Therefore, the method 1 can easily be implemented, and the method 1 can be configured in such a way, that image data encoded in the encoder unit can be verified in a relatively simple manner.

Thus, an improved method for verifying image data encoded in an encoder unit 1 might be provided.

Therein, all safe processing modules of the encoder unit can for example easily be implemented in Field Programmable Gate Arrays (FPGAs) or on modern and powerful processors. Further, the modules that need to be safety-qualified and thus are time consuming to develop can be kept relatively simple, whereas the complicated modules do not need to be safety qualified and can rather be made safe by the method 1 itself.

Therein, the step 5 of comparing the decoded image data to the acquired image data can further comprise the steps of dividing the decoded image data into a plurality of subregions, and, for each of the plurality of subregions, respectively comparing the subregion to a corresponding region of the acquired image data.

The step 5 of comparing the decoded image data to the acquired image data can further comprise using at least two different image comparison algorithms to respectively compare the decoded image data to the acquired image data, wherein it is determined that the decoded image data corresponds to the acquired image data only if more than a predetermined number of the at least two different image comparison algorithms have determined that the decoded image data corresponds to the acquired image data.

FIG. 2 illustrates a flowchart of a method for verifying image data transmitted from a source of image data to a processing unit for processing the image data 10 according to embodiments of the invention.

In particular, FIG. 2 shows a method for verifying image data transmitted from a source of image data to a processing unit for processing the image data 10 by means of an encoder unit, wherein the encoder unit comprises a safe part and a non-safe part, and a decoder unit, wherein the decoder unit comprises a safe part and a non-safe part wherein in a first step 11 image data is acquired in the safe part of the encoder unit from the source of image data, the image data is encoded in the non-safe part of the encoder unit by a non-safe encoder in a step 12, the encoded image data is decoded by a non-safe decoder in the non-safe part of the encoder unit in a step 13 and the decoded image data is compared with the acquired image data in the safe part of the encoder unit in a step 14, wherein a safety focused reaction is initiated if the decoded image data does not match the acquired image data exactly nor within an acceptable threshold for the comparison, and wherein upon successful comparison a first safety sequence is generated by the safe part of the encoder unit based on the decoded image data, wherein the encoded image data and, in case of a successful comparison, the first safety sequence are further transmitted to a decoder unit for decoding the encoded image data, wherein the encoded image data and the first safety sequence are transmitted to the decoder unit in a step 15, wherein the encoded image data is decoded by a non-safe decoder in the non-safe part of the decoder unit in a step 16, a second safety sequence is generated based on the decoded image data in the safe part of the decoder unit in a step 17, and the first safety sequence is compared with the second safety sequence in the safe part of the decoder unit in a step 18, wherein the correspondingly verified decoded image data is transmitted to the processing unit for further processing the image data if the first safety sequence corresponds to the second safety sequence, and wherein a second safety focused reaction is initiated if the first safety sequence does not correspond to the second safety sequence.

Thus, an improved method for verifying image data transmitted from a source of image data to a processing unit for processing the image data 10 might be provided. According to the method 10, the parts of the encoder unit and the parts of the decoder unit that are not safety critical are doing most of the work, respectively components that do not need to be safety-qualified and do not need to be developed according to stringent safety standards. In particular, the use of a safe encoder and/or a safe decoder would require immense efforts to develop according to safety standards due to their size and complexity. Further, only as much safe parts as necessary to enable these non-safe parts to operate safely are utilized, wherein each of the utilized safe parts, for example a safe comparing unit to compare the decoded image data with the acquired image data in the encoder unit or the safe safety sequence generating unit for generating a second safety sequence for the decoded image data in the decoder unit, can be kept very simple. Therefore, the method 10 can easily be implemented, and the method 10 is configured in such a way, that image data encoded in the encoder unit can be verified in a relatively simple manner. Further, a two-step safety mechanism, in particular comparing the decoded image data with the acquired image data on the one hand and comparing a first and second safety sequence on the other hand, is provided that provides end-to-end protection for image data, for example video frames.

According to the embodiments of FIG. 2, the acquired image data includes video frames.

Further, the two-step safety mechanism especially includes a video frame similarity comparison to safeguard the encoding process in the encoder unit and an additional verification using safety sequences to safeguard the decoding process in the decoder unit.

Therein, the first safety focused reaction includes one or more of totally stopping the streaming respectively the acquiring of image data, flagging decoded frames, respectively decoded image data that do not correspond to the corresponding input data or dropping it, or flagging individual sub-regions of a corresponding frame as invalid.

Further, the second safety focused reaction can for example include one or more of not forwarding the corresponding frame, respectively data to the processing unit if the first safety sequence does not correspond to the second safety sequence, correspondingly informing the processing unit that the first safety sequence does not correspond to the second safety sequence, or flagging corresponding sub-regions of a corresponding frame as invalid, for example by blanking out invalid or corrupt areas.

Therein, in step 14 the decoded image data and the acquired image data can especially be considered as being similar if a whole frame and/or all captured regions of a frame match.

According to the embodiments of FIG. 2, the step 14 of comparing the decoded image data to the acquired image data in the encoder unit further comprises dividing the decoded image data into a plurality of subregions, and, for each of the plurality of subregions, respectively comparing the corresponding subregion to a corresponding region of the acquired image data.

In particular, the comparison can be done on various regions of a corresponding input frame, for example the full frame at once, a slice of a frame at a time, on a macroblock or coding tree level unit, on a transform block size level of the underlying codec, or on a combination of comparisons based on frames which respectively have different sizes, wherein respectively also a different threshold can be used for each comparison.

Further, the comparison can be done on pixels as a whole, or on individual components of a pixel, for example separately on luma and chroma components.

Further, the comparison in step 14 can be done with various image comparison algorithms. For example, the comparison can be done by using the same transformation(s) as the underlying codec and comparing the transformed coefficients of the original region(s) and the encoded region(s) to match with a certain threshold, by using standard algorithms for comparing images such as Peak Signal to Noise Ratio or the Structural Similarity Index, or by using a machine learning model, for example a neural network that is trained based on correspondingly labelled training data, respectively labelled data respectively representing the similarity between two input images. Therein, the used threshold for the image comparison algorithm may respectively be chosen to be stricter the higher the required safety level is.

According to the embodiments of FIG. 2, step 14 of comparing the decoded image data with the acquired image data in the encoder unit further comprises using at least two different image comparison algorithms to respectively compare the decoded image data to the acquired image data, wherein it is determined that the decoded image data corresponds to the acquired image data only if more than a predetermined number of the at least two different image comparison algorithms have determined that the decoded image data corresponds to the acquired image data.

Therein, each of the at least two different image comparison algorithms can be based on a different threshold. Further, the thresholds of the at least two different image comparison algorithms may respectively be chosen to be stricter the higher the required safety level is.

According to the embodiments of FIG. 2, the first safety sequence and the second safety sequence are respectively checksums or cryptographic hashes.

Therein, a checksum or a hash can be generated for each frame.

Further, the step 15 of transmitting the first safety sequence to the decoder unit comprises transmitting the first safety sequence to the decoder unit over a safety layer.

The shown method 10 further comprises encrypting the communication between the encoder unit and the decoder unit, respectively encrypting the encoded image data and the first safety sequence, wherein the step 15 of transmitting the encoded image data and the first safety sequence to the decoder unit comprises transmitting the encrypted encoded image data and the encrypted first safety sequence to the decoder unit.

Therein, the encryption can for example be based on an advanced encryption standard.

Further, the shown method 10 also comprises adding a message authentication code to the communication between the encoder unit and the decoder unit, wherein the step 15 of transmitting the encoded image data and the first safety sequence to the decoder unit comprises transmitting the encoded image data and the first safety sequence together with the message authentication code to the decoder unit.

Therein, the message authentication code can for example be a hashed message authentication code, wherein also asymmetric key algorithms are used.

Thus, FIG. 2 illustrates a method which is based on two units, which work together. In particular, an encoder unit acquires image data, in particular video frames and outputs an encoded bitstream together with safety integrity data for informing a decoder unit about which parts of the encoded bitstream are deemed to be safe. Further, the decoder unit receives the encoded bitstream and checks the safe integrity data provided by the encoder unit, in particular on a frame-by-frame basis.

Figure 3:
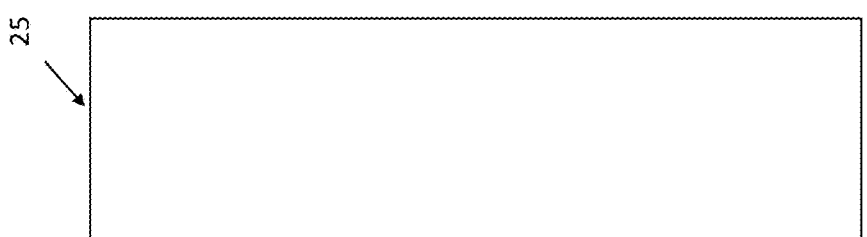
FIG. 3 illustrates a system for verifying image data transmitted from a source of image data to a processing unit for processing the image data according to embodiments of the invention.

FIG. 3 illustrates a system for verifying image data transmitted from a source of image data to a processing unit for processing the image data 20 according to embodiments of the invention.

As shown in FIG. 3, the system 20 comprises a source of image data 21 for acquiring image data, an encoder unit 22, a transmitting unit 23, a decoder unit 24, and a processing unit 25 for processing the image data outputted by the decoder unit 24, wherein the encoder unit 22 is configured to generate encoded image data based on the image data acquired by the source of image data 21, wherein the transmitting unit 23 is configured to transmit the encoded image data from the encoder unit 22 to the decoder unit 24, wherein the decoder unit 24 is configured to decode the encoded image data, and wherein the processing unit 25 is configured to process the verified decoded image data.

Therein, the source of image data 21 can for example be a CMOS camera sensor or another system for providing video frames.

Further, the transmitting unit can be a transmitting unit that is configured to transmit the data over a network, for example an Ethernet or a WLAN.

The processing unit can further for example be a display for displaying the data, or a driver assistance system of a vehicle, respectively a function of an autonomous driving vehicle.

According to the embodiments of FIG. 3, the encoder unit 22 comprises a safe part and a non-safe part. In particular, the shown encoder unit 22 comprises a safe acquiring unit 26, wherein the safe acquiring unit 26 is configured to acquire image data, a non-safe encoder 27, wherein the non-safe encoder 27 is configured to encode the acquired image data, a non-safe decoder 28, wherein the non-safe decoder 28 is configured to decode the encoded image data, and a safe comparing unit 29, wherein the safe comparing unit 29 is configured to compare the decoded image data with the acquired image data, wherein the safe comparing unit 29 is configured to initiate a safety focused reaction if the decoded image data does not match the acquired image data exactly nor within an acceptable threshold for the comparison, and to generate a first safety sequence based on the decoded image data, wherein the encoded image date and the first safety sequence are transmitted to a decoder unit for decoding the encoded image data, if the decoded image data matches the acquired image data exactly or within the acceptable threshold for the comparison.

According to the embodiments of FIG. 3, the acquiring unit 26 is a safety-qualified module that acquires image data, in particular video frames from the source of image data. Therein, the acquiring unit can be configured to check the integrity of the source of image data 21. Such integrity checks may depend or may even be imposed by the source of image data 21.

Further, the non-safe encoder 27, that does not need to be safety-qualified, can for example be a commercial-off-the-shelf (COTS) module or chip.

Similarly, the non-safe decoder 28, that also does not need to be safety-qualified, can for example be a commercial-off-the-shelf (COTS) module or chip.

Further, the non-safe decoder 28 could be a built-in part of the non-safe encoder 27.

The safe comparing unit 29 may further be realized by a safety-qualified software and/or hardware module.

Therein, the shown encoder unit 22 can further comprise a safety layer module, respectively a safety-qualified module that is configured to transmit the first safety sequence, for example the generated checksum or hash, via a safety layer. Safety layers are a standard technique in safety systems used for data transmission of safety critical data. The safety layer appropriately addresses threats like repetition, deletion, insertion, re-sequencing, corruption, delay and others during the transmission of safety critical data. It makes sure that the data transmitted can be checked not to be outdated/stale or out of sequence, and that the data has the necessary integrity for the safety level required.

The encoder unit may further comprise a safe color space conversion unit that is configured to transform the image acquired by the source of image data respectively the acquiring unit in a color space suitable for use by the non-safe encoder.

The shown decoder unit 24 comprises a safe part and a non-safe part, wherein the shown decoder unit 24 comprises a receiver 30 to receive encoded image data and, in case of a successful verification in the encoder unit, a first safety sequence, that have been transmitted to the decoder unit 24 by a corresponding transmitter of the encoder unit 22, wherein the encoded image data and the first safety sequence have been generated by the encoder unit 22, wherein the decoder unit 24 further comprises a non-safe decoder 31, wherein the non-safe decoder 31 is configured to decode the encoded image data received by the receiver, a safe safety sequence generating unit 32, wherein the safe safety sequence generating unit 32 is configured to generate a second safety sequence based on the decoded received image data, and a safe safety sequence matching unit 33, wherein the safe safety sequence matching unit 33 is configured to compare the first safety sequence with second safety sequence, wherein the safe safety sequence matching unit 33 is configured to allow transmission of the verified decoded image data to the processing unit 25 for further processing the image data if the first safety sequence corresponds to the second safety sequence, and to initiate a safety focused reaction if the first safety sequence does not correspond to the second safety sequence.

Therein, the receiver 30 does not need to be safety-qualified and can be realized based on a commercial-off-the-shelf solution, for example a streamer library and standard Linux libraries.

Further, the non-safe decoder 31, that does not need to be safety-qualified, can again for example be a commercial-off-the-shelf (COTS) module or chip, wherein a different non-safe decoder can be used if it produces the same results as the non-safe decoder 28 of the encoder unit (as it should according to e.g. the H.264/AVC or H.265/HEVC standards if it is a standards-compliant decoder), or wherein the non-safe decoder 31 can correspond to the non-safe decoder 28 of the encoder unit 22.

The safe safety sequence generating unit 32 and the safe safety sequence matching unit 33 may further respectively be realized by a safety-qualified software and/or hardware module.

The decoder unit 24 can further comprise a safety layer module, respectively a safety-qualified module that is configured to receive the first safety sequence, for example the generated checksum or hash, via a safety layer. Safety layers are a standard technique in safety systems used for data transmission of safety critical data. The safety layer appropriately addresses threats like repetition, deletion, insertion, re-sequencing, corruption, delay and others during the transmission of safety critical data. It makes sure that the data transmitted can be checked not to be outdated/stale or out of sequence, and that the data has the necessary integrity for the safety level required.

The decoder unit may further comprise a safe color space conversion unit that is configured to transform the image data decoded in the decoder unit in a color space suitable for use by the processing unit.

The system can further comprise an encrypting unit in the encoder unit and a decrypting unit in the decoder unit, wherein the encrypting unit is configured to encrypt the encoded image data and the first safety sequence, wherein the transmitting unit is configured to transmit the encrypted encoded image data and the encrypted first safety sequence to the decoder unit, where the safe decrypting unit decrypts the encrypted encoded image data and the encrypted first safety sequence.

Also the system can further comprise an adding unit in the encoder unit and a removing unit in the decoder unit, wherein the adding unit is configured to add a message authentication code to the encoded image data and the first safety sequence, wherein the transmitting unit is configured to transmit the encoded image data and the first safety sequence together with the message authentication code to the decoder unit, wherein a removing unit in the decoder unit is configured to check the message authentication code to determine the integrity of the encoded image data and the first safety sequence. The message authentication code can also be signed with an asymmetric key algorithm, and the signature can be transmitted alongside with the message authentication code.

Therein, the encrypting unit, the decrypting unit, the adding unit and the removing unit can for example respectively be realized in hardware such as an FPGA.

Further, the units of the encoder unit and/or the units of the decoder unit can respectively be integrated in one hardware unit respectively device. However, the encoder unit can for example also consist of a separate non-safe hardware unit, on which for example the non-safe encoder of the encoder unit can be arranged, and a separate safe hardware unit, on which for example the safe comparing module of the encoder unit can be arranged. Similarly, the decoder unit can also consist of a separate non-safe hardware unit, on which for example the non-safe decoder of the decoder unit can be arranged, and a separate safe hardware unit, on which for example the safe safety sequence generating unit and the safe safety sequence matching unit of the decoder unit can be arranged. Therein, the safe hardware units can be added to existing non-safe hardware units to upgrade the existing non-safe hardware units with safety functionality.

The shown encoder unit 22 is further configured to execute a method for verifying image data encoded in an encoder unit as described above, and the shown system 20 is configured to execute a method for verifying image data transmitted from a source of image data to a processing unit for processing the image data as described above.

The invention claimed is:

1. A method for verifying image data encoded in an encoder unit, wherein the encoder unit comprises a safe part and a non-safe part, the method comprising:
    (a) acquiring image data in the safe part of the encoder unit (2);
    (b) encoding the acquired image data by a non-safe encoder in the non-safe part of the encoder unit (3);
    (c) decoding the encoded image data by a non-safe decoder in the non-safe part of the encoder unit (4); and
    (d) comparing the decoded image data with the acquired image data in the safe part of the encoder unit (5), wherein if the decoded image data does not match the acquired image data exactly nor within an acceptable threshold for the comparison a safety focused reaction is initiated, and wherein if the decoded image data matches the acquired image data exactly or within the acceptable threshold for the comparison a first safety sequence is generated based on the decoded image data in the safe part of the encoder unit and the encoded image data and the first safety sequence are transmitted to a decoder unit for decoding the encoded image data, wherein safe means that the corresponding part is safety-qualified and/or has a high Integrity level and non-safe means that the corresponding part is not safety critical and does not have to be safety-qualified, wherein the safety focused reaction comprises flagging decoded image data that does not correspond to the originally acquired image data, respectively regions in the decoded image data that do not correspond to the corresponding regions in the originally acquired image data, or turning the corresponding source of image data off and/or deleting the image data acquired from the corresponding source of image data, and wherein the first safety sequence is one of a cryptographic hash, a checksum or a signature.

2. The method of claim 1, wherein comparing the decoded image data with the acquired image data (5) further comprises:
    dividing the decoded image data into a plurality of subregions; and
    for each of the plurality of subregions, respectively comparing the subregion to a corresponding region of the acquired image data.

3. The method of claim 1, wherein comparing the decoded image data with the acquired image data (5) further comprises using at least two different image comparison algorithms to respectively compare the decoded image data to the acquired image data, wherein it is determined that the decoded image data corresponds to the acquired image data only if more than a predetermined number of the at least two different image comparison algorithms have determined that the decoded image data corresponds to the acquired image data.

4. A method for verifying image data transmitted from a source of image data to a processing unit for processing the image data by means of an encoder unit, wherein the encoder unit comprises a safe part and a non-safe part, and a decoder unit, wherein the decoder unit comprises a safe part and a non-safe part, the method comprising:
    (a) acquiring image data from the source of image data in the safe part of the encoder unit (11);
    (b) encoding the image data in the non-safe part of the encoder unit (12);
    (c) verifying the image data encoded in the encoder unit by a method for verifying image data encoded in an encoder unit according to claim 1;
    (d) transmitting the encoded image data and a corresponding first safety sequence to the decoder unit (15);
    (e) decoding the encoded image data by a non-safe decoder in the non-safe part of the decoder unit (16);
    (f) generating a second safety sequence based on the decoded image data in the safe part of the decoder unit (17); and
    (g) comparing the first safety sequence with the second safety sequence in the safe part of the decoder unit (18), wherein the verified decoded image data is transmitted to the processing unit for further processing the image data if the first safety sequence corresponds to the second safety sequence, and wherein a safety focused reaction is initiated if the first safety sequence does not correspond to the second safety sequence, and wherein the second safety sequence is one of a cryptographic hash, a checksum or a signature.

5. The method of claim 4, wherein transmitting the first safety sequence to the decoder unit comprises transmitting the first safety sequence to the decoder over a safety layer.

6. The method of claim 4, wherein the method further comprises respectively encrypting the encoded image data and the first safety sequence, wherein the step of transmitting the encoded image data and the first safety sequence to the decoder unit (15) comprises transmitting the encrypted encoded image data and the encrypted first safety sequence to the decoder unit, or wherein the method (10) further comprises a step of adding a message authentication code to the encoded image data and the first safety sequence, and wherein the step of transmitting the encoded image data and the first safety sequence to the decoder unit (15) comprises transmitting the encoded image data and the first safety sequence together with the message authentication code to the decoder unit.

7. An encoder unit, wherein the encoder unit (22) comprises a safe acquiring unit (26), wherein the safe acquiring unit is configured to acquire image data, a non-safe encoder (27), wherein the non-safe encoder (27) is configured to encode the acquired image data, a non-safe decoder (28), wherein the non-safe decoder (28) is configured to decode the encoded image data, and a safe comparing unit (29), wherein the safe compare the decoded image data with the acquired image data, wherein the safe comparing unit (29) is configured to initiate a safety focused reaction if the decoded image data does not match to the acquired image data exactly nor within an acceptable threshold for the comparison, and to generate a first safety sequence based on the decoded image data, wherein the encoded image data and the first safety sequence are transmitted to a decoder unit for decoding the encoded image data, if the decoded image data matches the acquired image data exactly or within the acceptable threshold for the comparison, wherein safe means that the corresponding part is safety-qualified and/or has a high integrity level and non-safe means that the corresponding part is not safety critical and does not have to be safety-qualified, wherein the safety focused reaction comprises flagging decoded image data that does not correspond to the originally acquired image data, respectively regions in the decoded image data that do not correspond to the corresponding regions in the originally acquired image data, or turning the corresponding source of image data off and/or deleting the image data acquired from the corresponding source of image data, and wherein the first safety sequence is one of a cryptographic hash, a checksum or a signature.

8. The encoder unit of claim 7, wherein the encoder unit further comprises a safe dividing unit, wherein the safe dividing unit is configured to divide the decoded image data into a plurality of subregions, and wherein the safe comparing unit (29) is configured to, for each of the plurality of subregions, respectively compare the subregion to a corresponding region of the acquired image data.

9. The encoder unit of claim 7, wherein the safe comparing unit (29) is configured to use at least two different image comparison algorithms to respectively compare the decoded image data with the acquired image data, wherein it is determined that the decoded image data corresponds to the acquired image data only if more than a predetermined number of the at least two different image comparison algorithms have determined that the decoded image data corresponds to the acquired image data.

10. A decoder unit, wherein the decoder unit (24) comprises a receiver (30) to receive encoded image data, wherein the encoded image data has been verified by an encoder unit according to claim 7, and a corresponding first safety sequence that has been generated in case of successful verification of the encoded image data in the encoder unit, a non-safe decoder, wherein the non-safe decoder (31) is configured to decode the encoded image data, a safe safety sequence generating unit (32), wherein the safe safety sequence generating unit (32) is configured to generate a second safety sequence based on the decoded image data, and a safe safety sequence matching unit (33), wherein the safe safety sequence matching unit (33) is configured to compare the first safety sequence with the second safety sequence, wherein the safe safety sequence matching unit (33) is configured to allow transmission of the verified decoded image data to a processing unit for further processing the image data if the first safety sequence corresponds to the second safety sequence, and to initiate a safety focused reaction if the first safety sequence does not correspond to the second safety sequence and wherein the second safety sequence is one of a cryptographic hash, a checksum or a signature.

11. A system for verifying image data transmitted from a source of image data to a processing unit for processing the image data, wherein the system (20) comprises a source of image data (21) for acquiring image data, an encoder unit (22) according to claim 7, a transmitting unit (23), a decoder unit (24), and a processing unit (25) for processing the acquired image data, wherein the encoder unit (22) is configured to generate encoded image databased on image data acquired from the source of image data, wherein the transmitting unit (23) is configured to transmit the encoded image data from the encoder unit (22) to the decoder unit (24), wherein the decoder unit (24) is configured to decode the encoded image data, and wherein the processing unit (25) is configured to process the decoded image data.

12. The system of claim 11, wherein the transmitting unit (23) is configured to transmit the first safety sequence to the decoder unit over a safety layer.

13. The system of claim 11, wherein the system (20) further comprises an encrypting unit, wherein the encrypting unit is configured to encrypt the encoded image data and the first safety sequence, wherein the transmitting unit (23) is configured to transmit the encrypted encoded image data and the encrypted first safety sequence to the decoder unit, and wherein the system further comprises a decrypting unit, wherein the decrypting unit is configured to respectively decrypt the encrypted encoded image data and the encrypted first safety sequence after transmission to the decoder unit, or wherein the system (20) further comprises an adding unit, wherein the adding unit is configured to add a message authentication code to the encoded image data and the first safety sequence, wherein the transmitting unit (23) is configured to transmit the encoded image data and the first safety sequence together with the message authentication code to the decoder unit, and wherein the system further comprises a removing unit, wherein the removing unit is configured to check the message authentication code to determine the integrity of the encoded image data and the first safety sequence after transmission to the decoder unit.

\* \* \* \* \*